United States Patent
Vinson et al.

(10) Patent No.: US 11,312,256 B2
(45) Date of Patent: Apr. 26, 2022

(54) MULTI-ROTOR AIRCRAFT COMPRISING A SYSTEM FOR PROPULSION AND FOR NON-PROPULSIVE ELECTRICITY GENERATION

(71) Applicant: SAFRAN ELECTRICAL & POWER, Blagnac (FR)

(72) Inventors: Garance Vinson, Blagnac (FR); Florent Nierlich, Blagnac (FR); Jean-Pierre Garcia, Blagnac (FR)

(73) Assignee: SAFRAN ELECTRICAL & POWER, Blagnac (FR)

(*) Notice: Subject to any disclaimer, the term of this patent is extended or adjusted under 35 U.S.C. 154(b) by 0 days.

(21) Appl. No.: 17/259,991

(22) PCT Filed: Jul. 15, 2019

(86) PCT No.: PCT/FR2019/051767
§ 371 (c)(1),
(2) Date: Jan. 13, 2021

(87) PCT Pub. No.: WO2020/016510
PCT Pub. Date: Jan. 23, 2020

(65) Prior Publication Data
US 2021/0370786 A1   Dec. 2, 2021

(30) Foreign Application Priority Data

Jul. 16, 2018 (FR) .................................. 1856549

(51) Int. Cl.
*B60L 53/24* (2019.01)
*B64D 27/24* (2006.01)
(Continued)

(52) U.S. Cl.
CPC ............... *B60L 53/24* (2019.02); *B60L 50/61* (2019.02); *B64D 27/24* (2013.01); *B64D 31/06* (2013.01);
(Continued)

(58) Field of Classification Search
None
See application file for complete search history.

(56) References Cited

U.S. PATENT DOCUMENTS 8,727,271 B2 * 5/2014 Salyer .................. B64C 27/14
244/17.11
2016/0340051 A1   11/2016 Edwards et al.
(Continued)

FOREIGN PATENT DOCUMENTS

| EP | 3103670 A1 | 12/2016 |
| EP | 3296212 A1 | 3/2018 |
| EP | 3318492 A1 | 5/2018 |

OTHER PUBLICATIONS

Search Report dated May 3, 2019, in FR Application No. 1856549 (2 pages).
(Continued)

*Primary Examiner* — Jared Fureman
*Assistant Examiner* — Aqeel H Bukhari
(74) *Attorney, Agent, or Firm* — Bookoff McAndrews, PLLC

(57) ABSTRACT

A propulsion and non-propulsive electrical generation system for an aircraft having at least one turbomachine and at least two pairs of rotors, the rotors of the same pair of rotors being symmetrically opposite on the aircraft with respect to the same center of symmetry, at least four motors each driving a rotor, at least one generator coupled to a turbomachine, an even number of power lines and at most equal to the number of rotors, each power line having at least one (Continued)

propulsion branch coupled to a motor, a battery coupled at the output to the propulsion branch, and an AC-DC converter coupled between an output of a generator and the propulsion branch.

9 Claims, 4 Drawing Sheets

(51) Int. Cl.
*B64D 41/00* (2006.01)
*B60L 50/61* (2019.01)
*B64D 31/06* (2006.01)
*H02J 4/00* (2006.01)
*B64D 27/02* (2006.01)

(52) U.S. Cl.
CPC ............... *B64D 41/00* (2013.01); *H02J 4/00* (2013.01); *B60L 2200/10* (2013.01); *B60L 2210/10* (2013.01); *B60L 2210/30* (2013.01); *B64D 2027/026* (2013.01); *B64D 2221/00* (2013.01)

(56) References Cited

U.S. PATENT DOCUMENTS

2018/0118356 A1* 5/2018 Armstrong ............. B63H 21/17
2021/0214094 A1* 7/2021 Harwood ................ H02J 3/005

OTHER PUBLICATIONS

International Search Report issued in International Application No. PCT/FR2019/051767 dated Oct. 10, 2019 (2 pages).

* cited by examiner

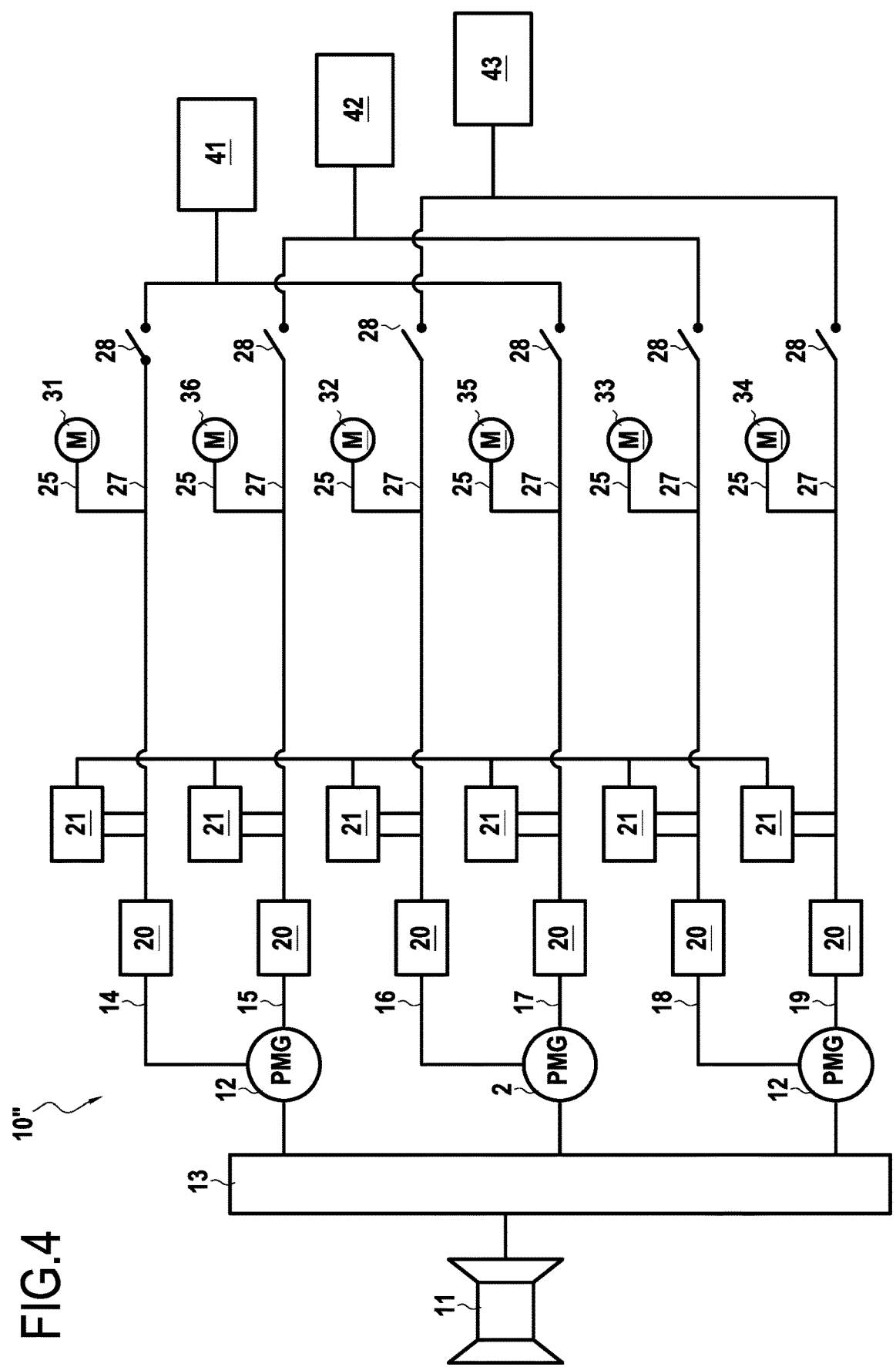

MULTI-ROTOR AIRCRAFT COMPRISING A SYSTEM FOR PROPULSION AND FOR NON-PROPULSIVE ELECTRICITY GENERATION

CROSS-REFERENCE TO RELATED APPLICATION(S)

This application is the U.S. national phase entry under 35 U.S.C. § 371 of International Application No. PCT/FR2019/051767, filed on Jul. 15, 2019, which claims priority to French Patent Application No. 1856549, filed on Jul. 16, 2018.

BACKGROUND OF THE INVENTION

The invention relates to a propulsion and non-propulsive electrical generation system for an aircraft and more particularly to the architecture of an electrical chain of a hybrid propulsion system for an aircraft provided with a plurality of rotors.

The vertical take-off and landing aircrafts are increasingly used in particular in the intra-urban and inter-urban transportation of goods or persons.

More and more of these aircrafts operate with hybrid propulsion systems, that is to say with a system comprising a turbomachine, an electrical generator and a battery, because purely electrical systems operating only from a battery are viable only for the transportation of a load over a short distance like those on the intra-urban market, the battery life, related to the low power density of the batteries compared to a turbogenerator, not being sufficient for the other markets.

OBJECT AND SUMMARY OF THE INVENTION

The invention aims at providing an electrical chain solution for a hybrid propulsion system for transporting large loads over long and medium distances. The invention aims for that purpose at providing a propulsion and non-propulsive electrical generation system for an aircraft which is durable, mass-optimized, scalable according to the needs and capacities of the batteries, cost-optimized both in terms of maintenance and exploitation, and optimized in terms of integration into the aircraft.

In a first object of the invention, there is proposed a propulsion and non-propulsive electrical generation system for an aircraft, the system comprising at least one turbomachine and at least two pairs of rotors, the rotors of the same pair of rotors being intended to have symmetrically opposite locations on the aircraft.

According to a general characteristic of the first object of the invention, the system further comprises:
- at least four electrical motors each driving a rotor,
- at least one electrical generator coupled to a turbomachine,
- at least two power supply lines, the number of power lines being at most equal to the number of rotors of said system, each power line comprising at least one electrical propulsion branch coupled to one of said electrical motors, a battery coupled at the output to said at least one propulsion branch, and an AC-DC converter coupled between an output of an electrical generator and said at least one propulsion branch.

The system according to the invention thus allows providing an aircraft with an electrical chain optimized in terms of mass, cost, performance, modularity and scalability, while allowing optimized integration on the aircraft thanks to the use of a reduced number of equipment and wiring, and to the use of lighter equipment easier to install on a multi-rotor aircraft with a hybrid or electrical propulsion system.

The system according to the invention allows in particular segmenting the overall electrical power into a plurality of independent power lines, of the high-voltage direct current (HVDC) type, forming with the associated motors and rotors a plurality of controlled propulsion modules.

The segmentation of the power supply also allows having power elements of smaller dimensions, which allows defining more effective electrical protections and cables. The segmentation allows lowering the power per element. For example, instead of a single 300 kW rectifier, it is possible to use, by segmentation, three 100 kW rectifiers, with lower currents.

The use of an electrical generator with an AC-DC converter allows creating and distributing a high-voltage DC bus which further allows connecting simply and efficiently a high-voltage DC battery in parallel. The converter allows monitoring the hybridization between the electrical generator and the battery by driving in particular the voltage on the power line, but also the starting of the turbomachine by reversing the electrical generator into an electric starting motor.

According to a first aspect of the propulsion and non-propulsive electrical generation system, the system can further comprise control means configured to cut off the power supply to the motors of the same pair of rotors when at least one motor of said pair of rotors is defected. According to a second aspect of the propulsion and non-propulsive electrical generation system, at least one power supply line can further comprise a non-propulsive electrical components supply branch.

It is thus possible to supply the non-propulsive electrical components of the aircraft from various power supply lines.

According to a third aspect of the propulsion and non-propulsive electrical generation system, the or each electrical generator can comprise an electrical machine provided with at least two electrically and electromagnetically independent three-phase windings, an independent and isolated AC-DC rectifier for each three-phase winding integrated into the electrical machine, and a rapid electromechanical disconnection device connected between the turbomachine and the electrical generator, the AC-DC converter of each power line being formed by an AC-DC rectifier of an electrical machine.

The multi-winding electrical machine allows reducing the overall mass of the system while respecting the electrical and electromagnetic isolation between the windings. For example, it allows using two machines each provided with three three-phase windings rather than six machines each provided with a single three-phase winding.

The integration of the AC-DC converters in the electrical machine forms a Smart Generator which allows optimizing the integration and the mass of the system. It also allows achieving greater power density compared to the induction machines or to the direct current machines.

The AC-DC converters are mechatronically integrated. It therefore shares the liquid cooling circuit of the turbomachine and of the electronic generator.

The rapid electromechanical disconnection device allows isolating the electrical generator from the turbomachine.

According to a fourth aspect of the propulsion and non-propulsive electrical generation system, said electrical generator can be a permanent-magnet electrical machine.

A permanent-magnet electrical machine has a better power density than other types of machines.

According to a fifth aspect of the propulsion and non-propulsive electrical generation system, each power line can further comprise a DC-DC electrical converter connected between the AC-DC converter and the battery to allow recharging of the battery from the electrical generator.

The DC-DC electrical converter facilitates recharging the battery from the electrical generator. The DC-DC electrical converter allows protecting the battery by avoiding too high currents and limiting the charging rate.

According to a sixth aspect of the propulsion and non-propulsive electrical generation system, the system can further comprise high-speed and high-integrity serial digital buses coupled between the control means and the motors.

The high-speed and high-integrity serial digital buses can use a communication protocol such as very high-speed synchronous and deterministic Ethernet protocol. The Ethernet standard allows using standard dissimilar physical layers (optical or copper) already qualified and therefore at lower costs. It is also possible to use other types of buses such as LVDS®, RS 485® buses for example.

According to a seventh aspect of the propulsion and non-propulsive electrical generation system, the control means can comprise a control card per power line, the control cards being in communication with each other, each control card comprising a module for monitoring the voltage of the power line with which it is associated, configured to control the voltage to be provided by the AC-DC converter and the voltage to be provided by the battery based on the charge level of the battery and on the voltage of the motors supplied by the power line, the voltage depending on the speed or on the torque required by the motors.

According to an eighth aspect of the propulsion and non-propulsive electrical generation system, comprising twice as many motor pairs as rotor pairs, each power line comprising two propulsion branches, and each pair of rotors being associated with two separate power lines, the first motor of the first rotor and the first motor of the second rotor of the same pair of rotors being supplied by a first power line and the second motor of the first rotor and the second motor of the second rotor of said same pair of rotors being supplied by a second power line.

Each power line thus supplies two motors driving the two rotors of the same pair of rotors, the rotors being symmetrically opposite on the aircraft with respect to an axis or a point of the aircraft. This thus makes the failure of a power line or of the motors supplied by the line compensable by the control means to maintain a symmetrically balanced propulsion for the aircraft.

In another object of the invention, there is proposed an aircraft comprising a propulsion and non-propulsive electrical generation system as defined above.

BRIEF DESCRIPTION OF THE DRAWINGS

The invention will be better understood with the reading made hereinafter, by way of indication but without limitation, with reference to the appended drawings in which:

FIG. 4 schematically represents an electrical architecture of a propulsion and non-propulsive electrical generation system according to a third embodiment of the invention;

DETAILED DESCRIPTION OF EMBODIMENTS

Figure 1:
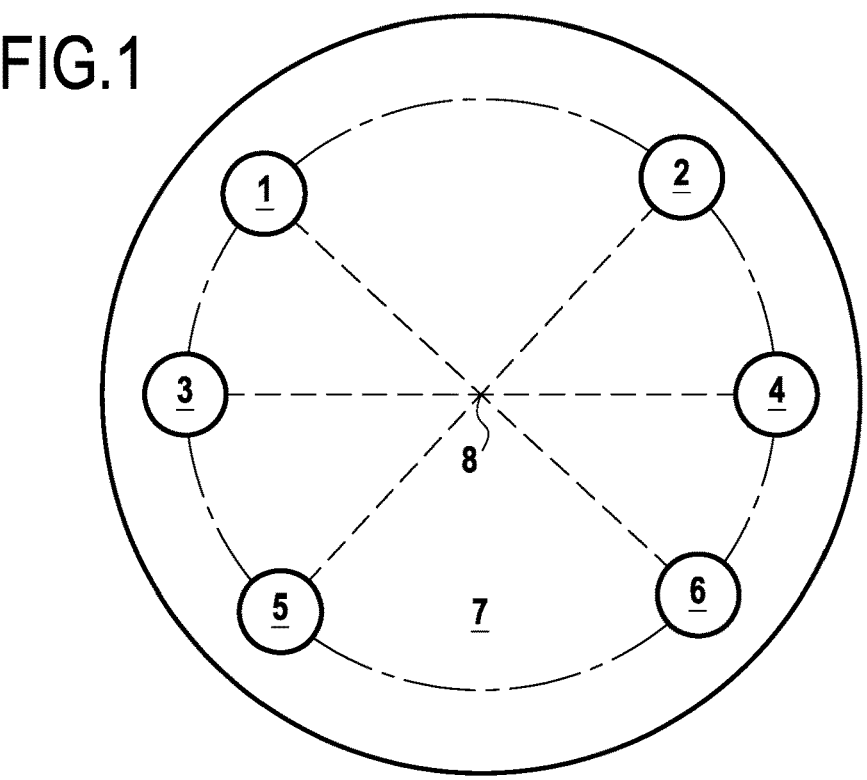
FIG. 1 schematically shows the distribution of the rotors of a multi-rotor aircraft according to one embodiment of the invention.

FIG. 1 schematically shows the distribution, on a chain-dotted circle, of the rotors 1 to 6 of a multi-rotor aircraft 7 according to one embodiment of the invention.

In the example illustrated, an aircraft 7 comprises six rotors 1 to 6 forming three pairs of rotors, the rotors of the same pair being symmetrically opposite with respect to a center of symmetry 8. The first pair of rotors comprises the rotors 1 and 6, the second pair of rotors comprises the rotors 2 and 5, the third pair of rotors comprises the rotors 3 and 4.

Figure 2:
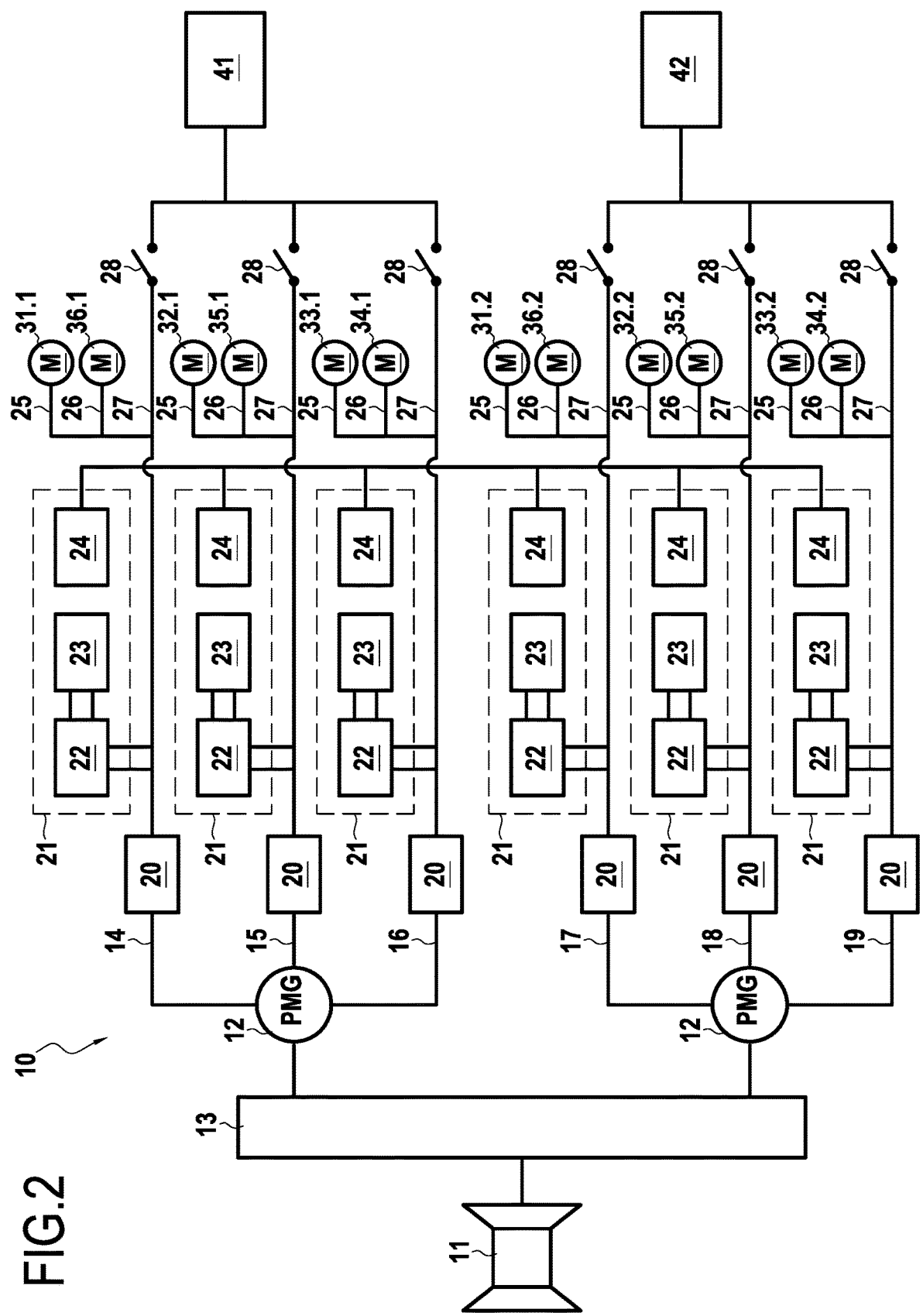
FIG. 2 schematically represents an electrical architecture of a propulsion and non-propulsive electrical generation system according to a first embodiment of the invention.

FIG. 2 schematically represents a first electrical architecture of a propulsion and non-propulsive electrical generation system 10 for the aircraft 7 according to a first embodiment of the invention.

The system 10 comprises a turbomachine 11 and two permanent-magnet electrical generators 12. The two electrical generators 12 are mechanically driven by the turbomachine 11 through the same gearbox 13.

Each electrical generator 12 comprises three electrical outputs each supplying a power supply line, respectively referenced 14 to 19 in FIG. 2. Each power line 14 to 19 comprises an AC-DC converter 20 and a power unit 21 including a battery 22, a DC-DC converter 23 and a control module 24. Each power line 14 to 19 further comprises a first and a second propulsion branches 25 and 26, as well as an additional supply branch 27 for power supplying non-propulsive electrical components 41 or 42.

In the first embodiment illustrated in FIG. 2, the system 10 further comprises six pairs of electrical motors, namely twelve electrical motors, the motors being digitally referenced 31.1, 31.2, 32.1, 32.2, 33.1, 33.2, 34.1, 34.2, 35.1, 35.2, 36.1, 36.2. The electrical motors 31.1 to 36.2 are each supplied by a propulsion branch 25 or 26 of a power line 14 to 19, each motor being associated with a rotor 1 to 6.

Each rotor 1 to 6 is associated with a pair of electrical motors to provide electrical redundancy and thus reduce the electrical power that each electrical motor must provide, which allows reducing the dimensions of the motors. In addition, the redundancy of the motors allows improving the operational safety of the propulsion system in the event of failure of one of the motors.

The first rotor 1 is driven by the pair of motors formed by the motors 31.1 and 31.2, the second rotor 2 is driven by the motors 32.1 and 32.2, the third rotor 3 is driven by the motors 33.1 and 33.2, the fourth rotor 4 is driven by the motors 34.1 and 34.2, the fifth rotor 5 is driven by the motors 35.1 and 35.2 and the sixth rotor 6 is driven by the motors 36.1 and 36.2.

Each rotor 1 to 6 is thus driven by a pair of two electrical motors 31.1 to 36.2, each of the two motors of the same pair of motors being supplied by a different power line 14 to 19. Thus, the first motor 31.1 of the first pair of motors 31.1 and 31.2 is supplied by the first propulsion branch 25 of the first power line 14 while the second motor 31.2 of the first pair of motors 31.1 and 31.2 is supplied by the first propulsion branch 25 of the fourth power line 17. The first motor 32.1 of the second pair of motors 32.1 and 32.2 is supplied by the first propulsion branch 25 of the second power line 15 while the second motor 32.2 of the second pair of motors 32.1 and 32.2 is supplied by the first propulsion branch 25 of the fifth power line 18. The first motor 33.1 of the third pair of motors 33.1 and 33.2 is supplied by the first propulsion branch 25 of the third power line 16 while the second motor 32.2 of the third pair of motors 33.1 and 33.2 is supplied by the first propulsion branch 25 of the sixth power line 19. The first motor 34.1 of the fourth pair of motors 34.1 and 34.2 is supplied by the second propulsion branch 26 of the third power line 16 while the second motor 34.2 of the fourth pair of motors 34.1 and 34.2 is supplied by the second propulsion branch 26 of the sixth power line 19. The first motor 35.1 of the second pair of motors 35.1 and 35.2 is supplied by the second propulsion branch 26 of the second power line 15 while the second motor 35.2 of the fifth pair of motors 35.1 and 35.2 is supplied by the second propulsion branch 26 of the fifth power line 18. The first motor 36.1 of the sixth pair of motors 36.1 and 36.2 is supplied by the second propulsion branch 26 of the first power line 14 while the second motor 36.2 of the sixth pair of motors 36.1 and 36.2 is supplied by the second propulsion branch 26 of the fourth power line 17.

The three additional supply branches 27 of the first three power lines 14 to 16 supply a first set of non-propulsive electrical components 41 via three controlled switches 28 each allowing coupling a power line to the components. The three additional supply branches 27 of the last three power lines 17 to 19 supply a second set of non-propulsive electrical components 42 via three controlled switches 28 each allowing coupling a power line to the components.

The control modules 24 of the power lines 14 to 19 are coupled together and form together control means. Each communication module 24 of a power line 14 to 19 thus controls the battery 23 and the DC-DC converter 22 to recharge the battery from an electrical generator 12 via the AC-DC converter 20 or to deliver a power supply voltage to the propulsion branches 25 and 26 of the power line based on the charge level of the battery 23 and on the power required by the corresponding electrical motors.

In addition, the control modules 24 are coupled to each other and to the motors via high-speed and high-integrity serial digital buses.

The segmentation of the supply power provided by this architecture allows cutting off the power supply to two symmetrically opposite motors when a motor or a line is defective.

Figure 3:
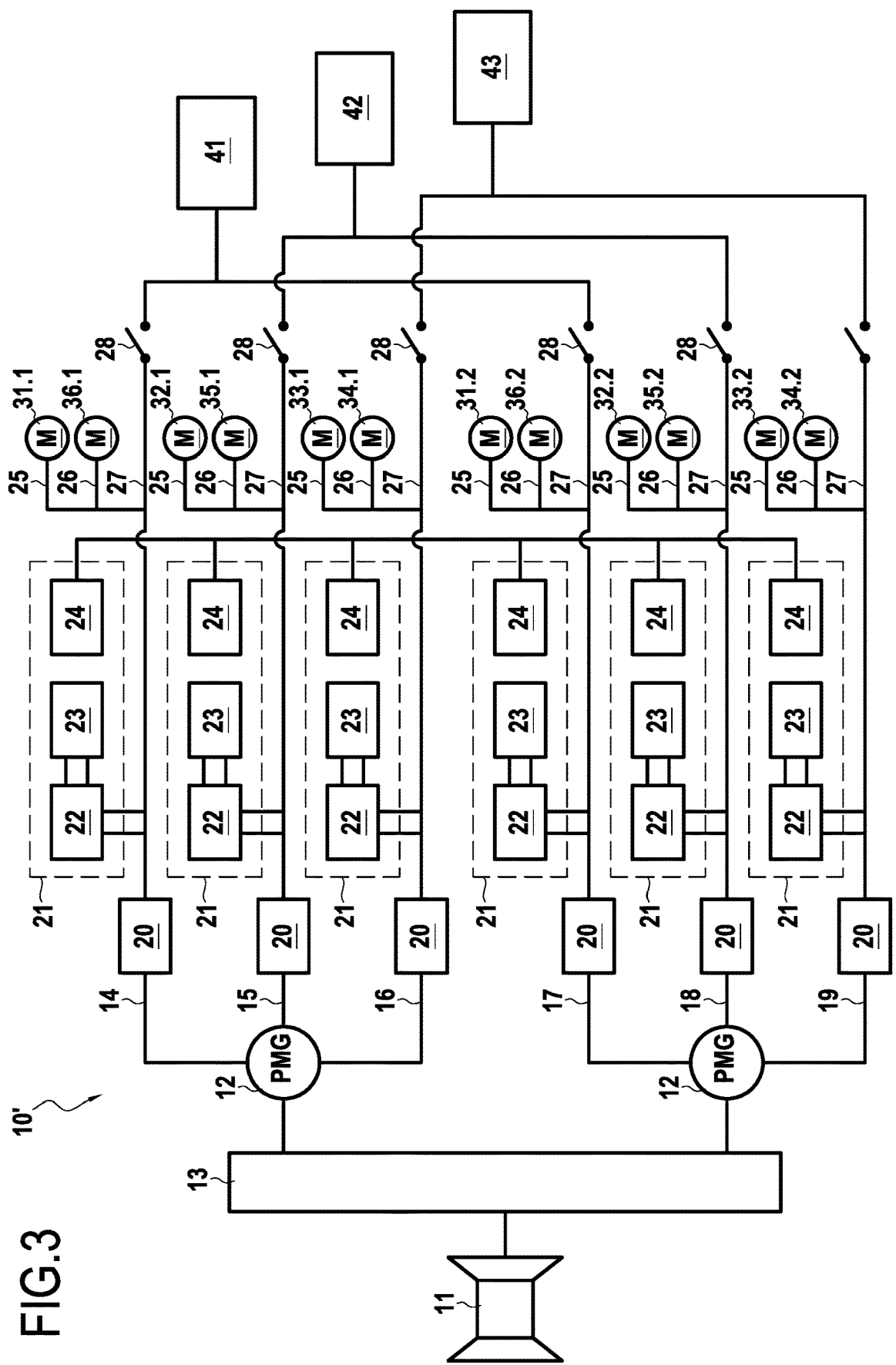
FIG. 3 schematically represents an electrical architecture of a propulsion and non-propulsive electrical generation system according to a second embodiment of the invention.

FIG. 3 schematically represents a second electrical architecture of a propulsion and non-propulsive electrical generation system 10' for the aircraft 7 according to a second embodiment of the invention. The elements identical to the first embodiment illustrated in FIG. 2 bear the same reference numerals.

This architecture differs from the first architecture of the first embodiment illustrated in FIG. 2 in that it supplies three sets of different non-propulsive electrical components 41 to 43. The additional supply branch 27 of the first power line 14 and the additional supply branch 27 of the fourth power line 17 supply a first set of non-propulsive electrical components 41 via two controlled switches 28 each allowing coupling a power line to the components. The additional supply branch 27 of the second power line 15 and the additional supply branch 27 of the fifth power line 18 supply a second set of non-propulsive electrical components 42 via two controlled switches 28 each allowing coupling a power line to the components. And the additional supply branch 27 of the third power line 16 and the additional supply branch 27 of the sixth power line 19 supply a third set of non-propulsive electrical components 43 via two controlled switches 28 each allowing coupling a power line to the components.

FIG. 4 schematically represents a third electrical architecture of a propulsion and non-propulsive electrical generation system 10" for an aircraft according to a third embodiment of the invention. The elements identical to the second embodiment illustrated in FIG. 3 bear the same reference numerals.

This architecture differs from the second architecture of the second embodiment illustrated in FIG. 3 in that it comprises only six motors 31 to 36 each driving a rotor 1 to 6, each electrical motor 31 to 36 being supplied by a power line 14 to 16 which includes a single propulsion branch 25 and an additional supply branch 27, the system comprising three electrical generators 12 coupled to the turbomachine 11 via the same gearbox 13, each electrical generator 12 including two three-phase outputs each supplying a power line 14 to 19.

In the third embodiment, the control means are configured to cut off the power supply to a motor of a pair of motors when a defect appears in the operation of the other motor of the pair of motors.

Figure 5:
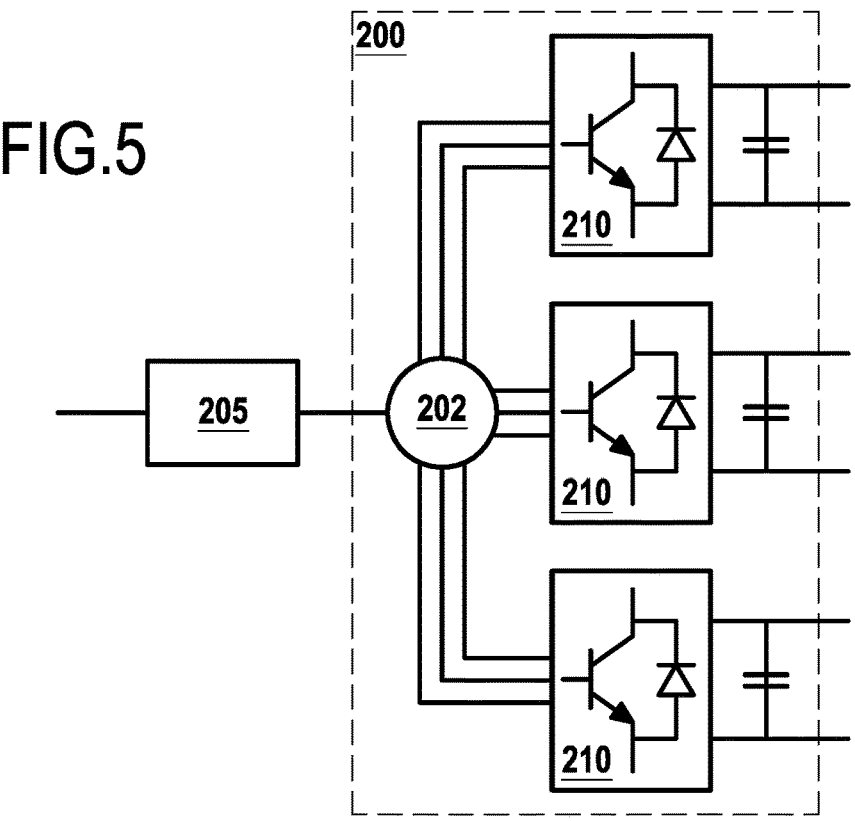
FIG. 5 schematically shows a variant of an electrical generator of the system according to the invention.

FIG. 5 schematically represents a variant of an electrical generator of the system according to the invention.

In this variant, the assembly formed of a three-output electrical generator 12 and of three AC-DC converters 20 is replaced by a smart generator 200 or smart motor associated with a rapid electromechanical disconnection device 205 connected between the turbomachine 11 and the electrical generator 200. The smart motor comprises an electrical machine 202 provided with three electrically and electromagnetically independent three-phase windings, and with an independent and isolated AC-DC rectifier 210 for each three-phase winding integrated into the smart motor.

The invention thus provides an electrical chain solution for a hybrid propulsion system allowing transporting large loads over long distances. The invention aims for that purpose at providing a propulsion and non-propulsive electrical generation system for an aircraft which is durable, mass-optimized, scalable according to the needs and capacities of the batteries, cost-optimized both in terms of maintenance and exploitation, and optimized in terms of integration into the aircraft.

The invention claimed is:

1. An aircraft comprising a propulsion and non-propulsive electrical generation system, the system comprising at least one turbomachine and at least two pairs of rotors, and the rotors of the same pair of rotors having symmetrically opposite locations on the aircraft with respect to a same center of symmetry,
    wherein the system further comprises:
    at least four electrical motors each driving a rotor,
    at least one electrical generator coupled to a turbomachine,
    at least two power supply lines, the number of power lines being at most equal to the number of rotors of said system, each power line comprising at least one electrical propulsion branch coupled to one of said electrical motors, a battery coupled at the output to said at least one propulsion branch, and an AC-DC converter coupled between an output of an electrical generator and said at least one propulsion branch.

2. The aircraft according to claim 1, wherein the system further comprises control means configured to cut off the power supply to the motors of the same pair of rotors when at least one motor of said pair of rotors is defected.

3. The aircraft according to claim 2, wherein the system further comprises high-speed and high-integrity serial digital buses coupled between the control means and the motors.

4. The aircraft according to claim 2, wherein the control means comprise a control card per power line, the control cards being in communication with each other, each control card comprising a module for monitoring the voltage of the power line with which it is associated, configured to control the voltage to be provided by the AC-DC converter and the voltage to be provided by the battery based on the charge level of the battery and on the voltage required by the motors supplied by the power line.

5. The aircraft according to claim 1, wherein at least one power supply line further comprises a non-propulsive electrical components supply branch.

6. The aircraft according to claim 1, wherein the or each electrical generator comprises an electrical machine provided with at least two electrically and electromagnetically independent three-phase windings, an independent and isolated AC-DC rectifier for each three-phase winding integrated into the electrical machine, and a rapid electromechanical disconnection device connected between the turbomachine and the electrical generator, the AC-DC converter of each power line being formed by an AC-DC rectifier of an electrical machine.

7. The aircraft according to claim 1, wherein said electrical generator is a permanent-magnet electrical machine.

8. The aircraft according to claim 1, wherein each power line further comprises a DC-DC electrical converter connected between the AC-DC converter and the battery to allow recharging of the battery from the electrical generator.

9. The aircraft according to claim 1, wherein the system comprises twice as many motors as rotors, each power line comprising two propulsion branches, and each pair of rotors being associated with two separate power lines, the first motor of the first rotor and the first motor of the second rotor of the same pair of rotors being supplied by a first power line and the second motor of the first rotor and the second motor of the second rotor of said same pair of rotors being supplied by a second power line.

* * * * *